United States Patent Office 3,053,834
Patented Sept. 11, 1962

3,053,834
21-PHOSPHATES OF STEROID ACETALS AND KETALS
Josef Fried, Princeton, N.J., assignor to Olin Mathieson Chemical Corporation, New York, N.Y., a corporation of Virginia
No Drawing. Filed Jan. 26, 1961, Ser. No. 85,002
13 Claims. (Cl. 260—239.55)

This invention relates to, and has for its object the provisions of, a method of preparing physiologically active steroids, and to the physiologically active steroids produced thereby.

The steroids of this invention are 21-phosphates of the 16α,17α-acetal and ketal derivatives of 16α,17α-dihydroxy steroids and ketones or aldehydes and to the alkali metal salts thereof. More particularly, the steroids of this invention have the general formula (I)
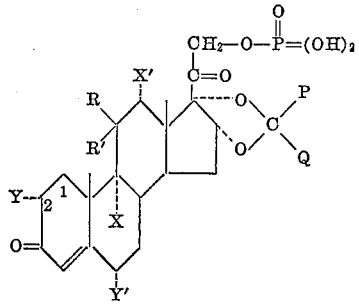

wherein the 1,2-position is saturated or double-bonded; R is hydrogen, R' is β-hydroxy or together R and R' is keto; X is hydrogen, halogen (i.e. fluoro, chloro, bromo or iodo), or lower alkyl; X' is hydrogen or lower alkyl; at least one of the symbols X and X' being hydrogen; Y is hydrogen or methyl; Y' is halogen (preferably fluoro); and P and Q are hydrogen, lower alkyl, halo-lower alkyl, monocyclic cycloalkyl, monocyclic aryl, monocyclic aryl lower alkyl, monocyclic heterocyclic or monocyclic heterocyclic lower alkyl; or together with the carbon atom to which they are joined P and Q is cycloalkyl or monocyclic heterocyclic. Not more than one of the symbols P and Q represents hydrogen in a given compound. Particularly preferred are those compounds wherein the 1,2-position is double-bonded, R is hydrogen and R' is β-hydroxy or together R and R' are keto, X is halogen (optimally fluoro), Y is hydrogen and P and Q each is lower alkyl.

The compounds of this invention are prepared by reacting a steroid of the formula (II)
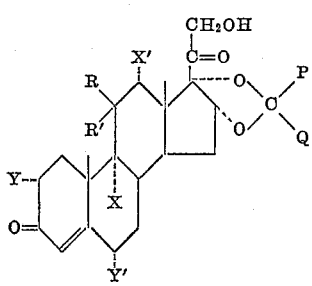

with phosphorous oxychloride in the presence of a tertiary base such as pyridine, triethylamine etc. The resulting chloride intermediate of the formula (III)
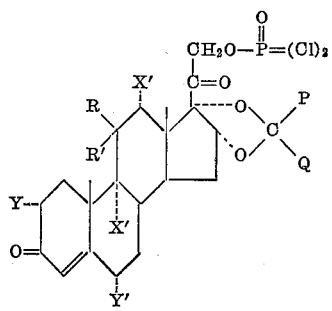

is hydrolyzed with water in the presence of the same tertiary base to obtain a compound of Formula I. If desired, treatment with an alkali metal compound, e.g. an alkali metal hydroxide such as sodium hydroxide, potassium hydroxide or the like, an alkali metal carbonate such as sodium carbonate, potassium carbonate or the like, yields the alkali metal salt of the 21-phosphate. Both the mono- and di-alkali metal salts are contemplated.

In Formulas II and III above, the symbols have the same meaning assigned in Formula I.

The compounds of Formula II are prepared by interacting a steroid reactant of the general formula (IV)
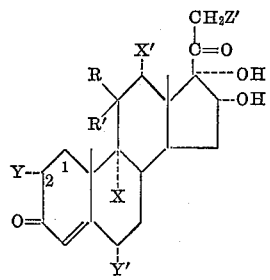

wherein the 1,2-position is saturated or double-bonded; R, R', X, X', Y and Y' are as hereinbefore defined; and Z' is hydroxy, with an aldehyde or ketone of the formula:

wherein P and Q are as hereinbefore defined, and recovering the resultant acetal or ketal derivative. The reaction is preferably carried about by treating a suspension or solution of the steroid in the aldehyde or ketone with or without an inert organic solvent (e.g. dioxane) with an acid catalyst (e.g. perchloric acid, p-toluenesulfonic acid and hydrochloric acid), neutralizing the acid and recovering the acetal or ketal derivative formed.

Among the suitable starting steroids utilizable for the production of compounds of Formula II and conversion to compounds of Formula I in the process of this invention may be mentiioned, 6α-halo-16α-hydroxyhydrocortisone (e.g. 6α-fluoro-16α-hydroxyhydrocortisone), 6α-halo-16α-hydroxycortisone, 6α-halo-16α-hydroxy-prednisolone, 6α-halo-16α-hydroxyprednisone, 6α,9α-dihalo-16α-hydroxyhydrocortisone (e.g. 6α,9α-difluoro-16α-hydroxyhydrocortisone), 6α,9α-dihalo-16α-hydroxycortisone, 6α,9α-dihalo-16α - hydroxyprednisolone (e.g. 6α,9α - difluoro-16α-hydroxyprednisolone), 6α,9α-dihalo-16α-hydroxyprednisone, 2α-methyl - 6α - fluoro - 16α - hydroxyhydrocortisone, 2α-methyl-6α-fluoro - 16α - hydroxyhydrocortisone, 6α-halo-9α-(lower alkyl)-16α-hydroxyhydrocortisone (e.g. 6α-fluoro-9α-methyl - 16α - hydroxyhydrocortisone), 6α-halo-9α - (lower alkyl) - 16α - hydroxycortisone, 6α - halo - 9α - (lower alkyl) - 16α - hydroxyprednisolone, 6α - halo - 9α-(lower alkyl)-16α-hydroxyprednisone, 6α,9α-dihalo-12α-(lower alkyl)-16α-hydroxyhydrocortisone (e.g. 6α,9α-difluoro-12α-methyl-16α-hydroxyhydrocortisone), 6α,9α-dihalo-12α-(lower alkyl)-16α-hydroxycortisone, 6α,9α-dihalo-12α-(lower alkyl)-16α-hydroxyprednisolone (e.g. 6α-chloro-9α-fluoro-12α-methyl-16α-hydroxyprednisolone), and 6α,9α-dihalo-12α-(lower alkyl)-16α-hydroxyprednisone.

Particularly preferred steroid reactants are those wherein the 1,2-position is either saturated or double-bonded, R is hydrogen and R' is β-hydroxy or together R and R' are keto; X is hydrogen, chlorine or fluorine; Y is hydrogen; and Y' is fluoro.

In those cases where the starting steroid reactants are new compounds, they can be prepared from the corresponding 16-desoxy derivative by subjecting the latter to the oxygenating action of a microorganism such as *Streptomyces roseochromogenus* in accordance with the method described in the U.S. application of Josef Fried et al., Serial No. 739,943, filed June 4, 1958, now Patent No. 2,855,343.

Suitable aldehyde and ketone reactants include aldehydes such as paraldehyde, propanal, chloral hydrate, trifluoroacetaldehyde hemiacetal, heptafluorobutanal ethyl hemiacetal and hexanal; di(lower alkyl) ketones, such as acetone, diethyl ketone, dibutylketone, methylethylketone, and methyl isobutylketone; mono and dicycloalkyl ketones, such as cyclohexyl methyl ketone and dicyclopropyl ketone; cycloalkanones, such as cyclobutanone, cyclopentanone, cyclohexanone, suberone, and cyclodecanone; monocyclic aromatic aldehydes such as benzaldehyde, halobenzaldehydes (e.g. p-chlorobenzaldehyde and p-fluorobenzaldehyde), lower alkoxy benzaldehydes (e.g. o-anisaldehyde), di(lower alkoxy)benzaldehydes (e.g. veratraldehyde), hydroxybenzaldehydes (e.g. salicylaldehyde), dihydroxy-benzaldehydes (e.g. resorcylaldehyde), lower alkyl benzaldehydes (e.g. m-tolualdehyde and p-ethylbenzaldehyde), di(lower alkyl)benzaldehydes (e.g. o,p-dimethylbenzaldehyde), nitrobenzaldehydes, acylaminobenzaldehydes (e.g. N-acetylanthranilaldehyde), and cyanobenzaldehydes; monocyclic aromatic lower alkanals, such as phenylacetaldehyde, α-phenyl-propionaldehyde, β-phenylpropionaldehyde, γ-phenylbutyraldehyde, and aromatically substituted halo, lower alkoxy, hydroxy, lower alkyl, nitro, acylamido and cyano derivatives thereof; monocyclic heterocyclic aldehydes, such as picolinaldehydes, furfural, thiophene carbonals, and halo, lower alkoxy, hydroxy, lower alkyl, nitro, and cyano derivatives thereof; monocyclic heterocyclic lower alkanals; monocyclic aromatic lower alkyl ketones, such as acetophenone, propiophenone, butyrophenone, valerophenone, isocarprophenone, halophenyl lower alkyl ketones (e.g. p-chloroacetophenone and p-chloropropiophenone), (lower alkoxy) phenyl lower alkyl ketones (e.g. p-anisyl methyl ketone), di(lower alkoxy)phenyl lower alkyl ketones, hydroxyphenyl lower alkyl ketones, dihydroxyphenyl lower alkyl ketones (e.g. resacetophenone), (lower alkyl)phenyl lower alkyl ketones (e.g. methyl p-tolyl ketone), di(lower alkyl)phenyl lower alkyl ketones (o,p-xylyl methyl ketone), nitrophenyl lower alkyl ketones (e.g. p-nitroacetophenone), acylamidophenyl lower alkyl ketones (e.g. acetylanilines), and cyanophenyl lower alkyl ketones; benzophenone, and mono or bis substituted halo-lower alkoxy, hydroxy, lower alkyl, nitro, acylamido and cyano derivatives thereof; monocyclic aromatic lower alkanones, such as 1-phenyl-3-butanone and 1-phenyl-4-pentanone, and aromatically substituted derivatives thereof; monocyclic heterocyclic ketones, such as 2-acetylfuran, 2-benzoylfuran, and 2-acetyl-thiophene; monocyclic heterocyclic lower alkanones; and monocyclic heterocyclic ketones, such as alloxan.

All of the compounds of this invention are physiologically active substances which possess glucocorticoid and anti-inflammatory activity and hence can be used in lieu of known glucocorticoids such as hydrocortisone and cortisone in the treatment of rheumatoid arthritis, and in the treatment of dermatoses, for which purpose they can be administered in the same manner as hydrocortisone phosphate, for example, the dosage being adjusted for the relative potency of the particular steroid. They are particularly advantageous in those cases where a stable, water soluble preparation is desired.

The following examples are illustrative of the invention (all temperatures being in centigrade):

EXAMPLE 1

*16α,17α-Isopropylidene 6α-Fluorotriamcinolone 21-Phosphate (16α,17α-Isopropylidene-6α,9α-Difluoro-Δ$^{1,4}$-Pregnadiene-11β,16α,17α,21-Tetrol-3,20-Dione 21-Phosphate)*

To a suspension of 500 mg. of 6α-fluorotriamcinolone in 75 ml. of acetone is added 0.05 ml. of 72% perchloric acid and the mixture agitated at room temperature for three hours. During this period the crystals gradually dissolve and the clear solution is neutralized with dilute bicarbonate and the acetone removed in vacuo. The resulting crystalline suspension is filtered and the crystals washed with water. The dried material is recrystallized from 95% alcohol to give the pure 6α-fluorotriamcinolone 16α,17α-acetonide.

To a solution of .08 ml. of redistilled phosphorus oxychloride in 2 ml. of pyridine is added at −23° with stirring a solution of 200 mg. of 6α-fluorotriamcinolone acetonide in 3 ml. of anhydrous pyridine. The addition is complete within 10 seconds and the temperature rises to −10°. The reaction is allowed to proceed for an additional three minutes. To the dichloride thus formed, .16 ml. of water is added at a rate so that the reaction temperature does not exceed −10°. The mixture is then allowed to remain at room temperature for 12 minutes and the pyridine is removed in vacuo without applying external heat. The resulting thick syrup is taken up in chloroform and the 6α-fluorotriamcinolone 16α,17α-acetonide 21-phosphate is extracted several times with water.

The aqueous solution of the phosphate is carefully neutralized with potassium carbonate solution to pH 7 and lyophilized. The resulting white powder (515 mg.) is taken up in methanol and the resulting suspension is centrifuged. The supernatant is separated and concentrated in vacuo, taken up again in methanol and the process of centrifugation, separation and evaporation of the supernatant is repeated until the material obtained by evaporation of the supernatant is completely soluble in methanol. Addition of ether to a methanol solution of this material results in crystals of the dipotassium salt of 6α-fluorotriamcinolone 16α,17α-acetonide 21-phosphate. On drying at 137° this material loses 11.17% of its weight.

$\lambda_{max.}^{Nujol}$ 2.80–3.0 (broad), 5.83, 6.02 and 6.14μ

*Anal.*—Cal'd for $C_{24}H_{29}O_9K_2S_2P$ (608.64): C, 47.35; H, 4.80; K, 12.85; P, 5.09. Found: C, 45.81; H, 5.25; K, 11.28; P, 5.03.

EXAMPLE 2

*16α,17α-(2'-Butylidene)-6α-Fluorotriamcinolone 21-Phosphate*

To a suspension of 100 mg. of 6α-fluorotriamcinolone in 15 ml. of methyl ethyl ketone is added 0.05 ml. of 72% perchloric acid, and the mixture stirred at room temperature for two hours. The resulting solution is neutralized with sodium bicarbonate solution and after addition of water the methyl ethyl ketone is evaporated in vacuo. The resulting crystals are filtered, washed with water and dried in vacuo. Recrystallization from acetone-hexane gives the pure isobutylidene derivative.

The isobutylidene derivative is treated with phosphorus oxychloride, water and potassium carbonate according to the procedure described in Example 1 to obtain the dichloride, 16α,17α-(2'-butylidene)-6α-fluorotriamcinolone 21-phosphate and dipotassium salt, respectively.

EXAMPLE 3

*16α,17α-(4'-Methyl-2'-Pentylidene)-6α-Fluorotriamcinolone 21-Phosphate*

To a suspension of 100 mg. of 6α-fluorotriamcinolone in 15 ml. of methyl isobutyl ketone is added 0.05 ml. of 72% perchloric acid. The mixture is stirred at room temperature for 6 hours and the resulting solution extracted with dilute sodium bicarbonate solution, washed with water, the organic phase dried over sodium sulfate and the solvent evaporated in vacuo. Recrystallization of the resulting crystals from acetone-hexane gives the pure isohexylidene derivative.

The isohexylidene derivative is treated with phosphorus oxychloride and processed as in Example 1 to obtain the dichloride, 16α,17α-(4'-methyl-2'-pentylidene)-6α-fluorotriamcinolone 21-phosphate and dipotassium salt, respectively.

EXAMPLE 4

*16α,17α-Cyclohexylidene-6α-Fluorotriamcinolone 21-Phosphate*

A suspension of 200 mg. of 6α-fluorotriamcinolone in 15 ml. of redistilled cyclohexanone is treated for two hours as described in Example 3, and the product is then treated with phosphorus oxychloride and processed as in Example 1 to obtain the dichloride, 16α,17α-cyclohexylidene-6α-fluorotriamcinolone 21-phosphate and dipotassium salt, respectively. Neutralization of the 21-phosphate with sodium carbonate instead of potassium carbonate gives the disodium salt.

EXAMPLE 5

*16α,17α-(3'-Pentylidene)-6α-Fluorotriamcinolone 21-Phosphate*

A suspension of 200 mg. of 6α-fluorotriamcinolone in 30 ml. of diethyl ketone is treated for four hours as described in Example 3 and the product is treated with phosphorus oxychloride and processed as in Example 1 to obtain the dichloride, 16α,17α-(3'-pentylidene)-6α-fluorotriamcinolone 21-phosphate and dipotassium salt, respectively.

EXAMPLE 6

*16α,17α-Ethylidene-6α-Fluorotriamcinolone 21-Phosphate*

To a suspension of 200 mg. of 6α-fluorotriamcinolone in 15 ml. of freshly distilled paraldehyde is added 0.05 ml. of 72% perchloric acid and the mixture agitated for 3.5 hours at room temperature. The resulting solution is extracted with dilute bicarbonate and water, dried, and the excess paraldehyde removed in vacuo. The residual material represents 16α,17α-ethylidene-6α-fluorotriamcinolone.

Substitution of 6α,9α-difluoro-Δ$^{1,4}$-pregnadiene-16α,17α-21-triol-3,11,20-trione for 6α-fluorotriamcinolone in the procedures of Examples 1 through 6, yields the corresponding 11-keto derivatives. Treatment of the product in each instance with phosphorus oxychloride and processing according to Example 1 yields in each instance the corresponding dichloride, 21-phosphate and dipotassium salt.

EXAMPLE 7

*16α,17α-Isopropylidene-6α,9α-Difluoro-Δ$^4$-Pregnene-11β,16α,17α,21-Tetrol-3,20-Dione 21-Phosphate*

A suspension of 200 mg. of 6α,9α-difluoro-Δ$^4$-pregnene-11β,16α,17α,21-tetrol-3,20-dione in 30 ml. of acetone is stirred at room temperature with 100 mg. of p-toluenesulfonic acid monohydrate for 18 hours. The clear solution is neutralized with sodium bicarbonate solution and the acetone evaporated in vacuo. The resulting crystals are filtered and dried in vacuo. Recrystallization from acetone-hexane gives the pure isopropylidene derivative.

The isopropylidene derivative is treated with phosphorus oxychloride and processed according to Example 1 to obtain the corresponding dichloride, 21-phosphate and dipotassium salt.

Reaction of 6α,9α-difluoro-Δ$^4$-pregnene-16α,17α,21-triol-3,11,20-trione with acetone gives the corresponding 11-keto derivative and treatment of the product with phosphorus oxychloride with subsequent processing as in Example 1 yields the corresponding dichloride, 21-phosphate and dipotassium salt, respectively.

EXAMPLE 8

*16α,17α-Cyclohexylidene-6α-Fluoro-16α-Hydroxyhydrocortisone 21-Phosphate*

To a suspension of 100 mg. of 6α-fluoro-16α-hydroxyhydrocortisone in 15 ml. of cyclohexanone is added 0.05 ml. of 72% perchloric acid. The mixture is treated as in Example 3 and results in the formation of the cyclohexylidene derivative of 6α-fluoro-16α-hydroxyhydrocortisone.

If 6α-fluoro-16α-hydroxycortisone is substituted for the 6α-fluoro-16α-hydroxyhydrocortisone in the procedure of this example, 16α,17α-cyclhexylidene-6α-fluoro-16α-hydroxycortisone is obtained.

Treatment of each of the above products as in Example 1 yields the corresponding dichloride, 21-phosphate and dipotassium salt, respectively.

EXAMPLE 9

*16α,17α-Isopropylidene-6α-Fluoro-16α-Hydroxyprednisolone 21-Phosphate*

Treatment of 6α-fluoro-16α-hydroxyprednisolone with acetone in the presence of perchloric acid according to the procedure of Example 1 results in the formation of 16α,17α-isopropylidene 6α-fluoro-16α-hydroxyprednisolone and further treatment with phosphorus oxychloride as in the same example yields the 21-phosphate.

EXAMPLE 10

*16α,17α-Isopropylidene-6α-Fluoro-9α-Methyl-16α-Hydroxyprednisolone 21-Phosphate*

(A) PREPARATION OF 5α,6α-OXIDO-9α-METHYLHYDROCORTISONE 3,20-ETHYLENE KETAL

To a solution of 750 mg. of 9α-methylhydrocortisone 3,20-bis-ethylene ketal in 50 ml. of chloroform is added at 0° 7.5 ml. of 0.28 N perbenzoic acid. After 18 hours at 4° the mixture is washed successively with sodium iodide, sodium bicarbonate, dilute sodium sulfite and water, the chloroform solution dried and the solvent removed in vacuo. The residual 5α,6α-epoxide is recrystallized from acetone-hexane.

(B) PREPARATION OF 6β-FLUORO-9α-METHYLPREGNANE-5α,11β,17α,21-TETROL-3,20-DIONE 3,20-BIS-ETHYLENE KETAL

To a solution of 500 mg. of 5α,6α-epoxy-9α-methylhydrocortisone 3,20-bisethylene ketal in 60 ml. of dry benzene and 15 ml. of absolute ether is added 1 ml. of freshly redistilled boron trifluoride etherate and the solution allowed to remain at room temperature for three hours. After thorough washing with water the organic phase is dried over sodium sulfate and the solvents removed in vacuo. Recrystallization from acetone-hexane gives the pure fluorohydrin.

(C) PREPARATION OF 6α-FLUORO-9α-METHYLHYDROCORTISONE

To a solution of 500 mg. of 6β-fluoro-9α-methylpregnane - 5α - 11β,17α,21 - tetrol - 3,20 - dione 3,20 - bisethylene ketal in 25 ml. of glacial acetic acid is added 3 ml. of concentrated hydrochloric acid, and the resulting solution allowed to remain at room temperature for 18 hours. The mixture is diluted with water and chloroform, the chloroform solution washed with water, dilute sodium bicarbonate and again with water, dried over sodium sulfate and the solvent evaporated in vacuo. The resulting 6α-fluoro-9α-methylhydrocortisone is recrystallized from acetone-hexane.

(D) PREPARATION OF 6α-FLUORO-9α-METHYL-16α-HYDROXYHYDROCORTISONE

6α-fluoro-9α-methylhydrocortisone is fermented with *Streptomyces roseochromogenus* (Waksman No. 3689) following the procedure in application Serial No. 739,943. The resultant 6α-fluoro-9α-methyl-16α-hydroxyhydrocortisone is extracted from the filtered broth with methyl isobutyl ketone and recovered from the latter solvent by concentration and filtration of the resulting crystalline material.

(E) PREPARATION OF 6α-FLUORO-9α-METHYL-16α-HYDROXYPREDNISOLONE

6α-fluoro-9α-methyl-16α-hydroxyhydrocortisone is dehydrogenated in a concentration of 200 mg./ml. with *Nocardia aurantia* following the procedure in the application of Kroll et al., Serial No. 660,748, filed May 22, 1957, thereby yielding 6α-fluoro-9α-methyl-16α-hydroxyprednisolone.

(F) PREPARATION OF 16α,17α-ISOPROPYLIDENE-6α-FLUORO-9α-METHYL-16α-HYDROXYPREDNISOLONE

Following the procedure of Example 1, but substituting 500 mg. of 6α-fluoro-9α-methyl-16α-hydroxyprednisolone for the 6α-fluorotriamcinolone in that example, there is obtained 16α,17α-isopropylidene-6α-fluoro-9α-methyl-16α-hydroxyprednisolone.

Treatment of the isopropylidene derivative with phosphorus oxychloride and further processing as in Example 1, yields the corresponding dichloride, 21-phosphate and dipotassium salt, respectively.

EXAMPLE 11

*16α,17α-Isopropylidene-6α,9α-Difluoro-12α-Methyl-16α-Hydroxyhydrocortisone 21-Phosphate*

(A) PREPARATION OF 9α-FLUORO-12α-METHYLHYDROCORTISONE 3,20-BIS-ETHYLENE KETAL

A mixture of 2 g. of 9α-fluoro-12α-methylhydrocortisone, 40 mg. of p-toluenesulfonic acid, 32 ml. of ethylene glycol and 60 ml. of benzene is heated at reflux with a Dean-Stark separator for six hours. After cooling, the mixture is neutralized with dilute sodium bicarbonate, the layers separated and the aqueous phase extracted with chloroform. The combined benzene and chloroform phases are washed with water, dried over sodium sulfate and the solvents evaporated in vacuo. The residual diketal is recrystallized from acetone.

(B) PREPARATION OF 16α,17α-ISOPROPYLIDENE-6α,9α-DIFLUORO-12α-METHYL-16α-HYDROXYHYDROCORTISONE

Following the procedures in steps *a*, *b*, *c*, *d*, and *f* of Example 10, but substituting 800 mg. of 9α-fluoro-12α-methylhydrocortisone 3,20-bis-ethylene ketal for the 9α-methylhydrocortisone 3,20-bis-ethylene ketal in step *a*, there is obtained 16α,17α-isopropylidene-6α,9α-difluoro-12α-methyl-16α-hydroxyhydrocortisone.

Reaction of this isopropylidene derivative with phosphorus oxychloride and further processing as in Example 1 yields the corresponding dichloride, 21-phosphate and dipotassium salt, respectively.

EXAMPLE 12

*16α,17α-Isopropylidene-6α,9α-Difluoro-12α-Methyl-16α-Hydroxyprednisolone 21-Phosphate*

Following the procedures in steps *e* and *f* of Example 10, but substituting 6α,9α-difluoro-12α-methyl-16α-hydroxyhydrocortisone for the 6α-fluoro-9α-methyl-16α-hydroxyhydrocortisone in step *e*, there is obtained 16α,17α-isopropylidene-6α,9α-difluoro - 12α - methyl-16α-hydroxyprednisolone.

Reaction of this isopropylidene derivative with phosphorus oxychloride and further processing as in Example 1 but using sodium carbonate instead of potassium carbonate yields the corresponding dichloride, 21-phosphate and sodium salt, respectively.

EXAMPLE 13

*16α,17α-Chloral Derivative of 6α-Fluorotriamcinolone 21-Phosphate*

A suspension of 500 mg. of 6α-fluorotriamcinolone and 4 gm. of chloral hydrate in 20 ml. of dioxane is agitated at room temperature for 24 hours. The mixture is filtered, neutralized with aqueous sodium bicarbonate and extracted with chloroform. The chloroform-dioxane phase is dried over sodium sulfate, the solvent removed in vacuo and the residual chloral derivative crystallized from methanol.

The chloral derivative is treated with phosphorus oxychloride and further processed as in Example 1 to obtain the corresponding dichloride, 21-phosphate and dipotassium salt, respectively.

EXAMPLE 14

*16α,17α-(1,1,1-Trifluoroisopropylidene)-6α-Fluorotriamcinolone 21-Phosphate*

Following the procedure of Example 1 but replacing the 75 ml. of acetone used in that example by a mixture of 10 ml. of dioxane and 10 ml. of 1,1,1-trifluoroacetone there is obtained the trifluoroisopropylidene derivative. Further treatment with phosphorus oxychloride, water and potassium carbonate yields the corresponding dichloride, 21-phosphate and potassium salt, respectively.

EXAMPLE 15

*Acetophenone Derivative of 6α-Fluorotriamcinolone 21-Phosphate*

To a suspension of 4 g. of 6α-fluorotriamcinolone in 100 ml. of freshly redistilled acetophenone is added 1.0 ml. of 72% perchloric acid and the mixture stirred at room temperature for two hours, during which period all the 6α-fluorotriamcinolone has dissolved. The solution is neutralized by the addition of 8 ml. of 1.1 N NaOH and of sufficient aqueous bicarbonate to render it neutral. Water and chloroform is then added and the chloroform-acetophenone layer concentrated in high vacuum. The residue is recrystallized from acetone-hexane and the crystals washed well with hexane to remove adhering acetophenone.

This acetophenone derivative is reacted with phosphorus oxychloride and further processed as in Example 1 to obtain the corresponding dichloride, 21-phosphate and dipotassium salt.

EXAMPLE 16

*p-Nitroacetophenone Derivative of 6α-Fluorotriamcinolone 21-Phosphate*

To a suspension of 200 mg. of 6α-fluorotriamcinolone in a mixture of 7 ml. of dioxane and 4 grams of p-nitroacetophenone is added 0.05 ml. of 72% perchloric acid and the mixture stirred at room temperature for 3½ hours. The mixture is then neutralized with dilute sodium bicarbonate solution and the dioxane and excess p-nitroacetophenone removed by vacuum steam distillation. The residual aqueous suspension is extracted with chloroform, the chloroform layer washed with water, dried over sodium sulfate and the solvent removed in vacuo. The remaining derivative is purified by recrystallization from acetone-hexane.

The product is reacted with phosphorus oxychloride and further treated as in Example 1 to obtain the corresponding dichloride, 21-phosphate and dipotassium salt.

EXAMPLE 17

*Acetophenone Derivative of 6α,9α-Difluoro-Δ⁴-Pregnene 11β,16α,17α,21-Tetrol-3,20-Dione 21-Phosphate*

A suspension of 200 mg. of 6α,9α-difluoro-Δ⁴-pregnene-11β,16α,17α,21-tetrol-3,20-dione in 30 ml. of acetophenone is stirred at room temperature with 100 mg. of p-toluene-sulfonic acid monohydrate for 18 hours. The clear solution is neutralized with sodium bicarbonate solution and the acetone evaporated in vacuo. The resulting crystals are filtered and dried in vacuo. Recrystallization from acetone-hexane gives the pure acetophenone derivative.

Reaction of 6α,9α-difluoro-Δ⁴-pregnene-16α,17α,21triol-3,11,20-trione with acetophenone gives the corresponding 11-keto derivative.

Treatment of each of the above products with phosphorus oxychloride and further treating as in Example 1 yields the corresponding dichloride, 21-phosphate and dipotassium salt, respectively.

EXAMPLE 18

*Benzaldehyde Derivative of 6α-Fluoro-16α-Hydroxyhydrocortisone 21-Phosphate*

To a suspension of 100 mg. of 6α-fluoro-16α-hydroxyhydrocortisone in 15 ml. of benzaldehyde is added 0.05 ml. of 72% perchloric acid. The mixture is treated as in Example 15 and results in the formation of the benzaldehyde derivative of 6α-fluoro-16α-hydroxyhydrocortisone.

If 6α-fluoro-16α-hydroxycortisone is substituted for the 6α-fluoro-16α-hydroxyhydrocortisone in the procedure of this example the benzaldehyde derivative of 6α-fluoro-16α-hydroxycortisone is obtained.

Treatment of each of the above benzaldehyde derivatives with phosphorus oxychloride and further treatment as in Example 1 yields the corresponding dichloride, 21-phosphate and dipotassium salt, respectively.

EXAMPLE 19

*Furfural Derivatives of 6α-Fluoro-16α-Hydroxyprednisolone 21-Phosphate*

Treatment of 6α-fluoro-16α-hydroxyprednisolone with furfural in the presence of perchloric acid according to the procedure of Example 15 results in the formation of the furfural derivative of 6α-fluoro-16α-hydroxyprednisolone.

The furfural derivative, when treated with phosphorus oxychloride and further processed as in Example 1, yields the corresponding dichloride, 21-phosphate and dipotassium salt.

EXAMPLE 20

*16α,17α-Alloxan Derivative of 6α-Fluorotriamcinolone 21-Phosphate*

A suspension of 0.5 gm. 6α-fluorotriamcinolone and 2.5 gm. of alloxan in 20 ml. of dioxane and 0.15 ml. of 72% perchloric acid is agitated at room temperature for 24 hours. The mixture is neutralized with aqueous sodium bicarbonate solution and after the addition of 20 ml. of water extracted with chloroform. The chloroform extract is dried over sodium sulfate and evaporated to dryness in vacuo. The residual alloxan derivative is recrystallized from 95% alcohol.

The alloxan derivative, when treated with phosphorus oxychloride and processed as in Example 1, yields the corresponding dichloride, 21-phosphate and dipotassium salt.

EXAMPLE 21

*Dicyclopropyl Ketone Derivative of 6α-Fluorotriamcinolone 21-Phosphate*

Following the procedure of Example 14 but replacing the trifluoroacetone by dicyclopropyl ketone, there is obtained the dicyclopropyl derivative of 6α-fluorotriamcinolone, then the 21-phosphate.

This invention may be variously otherwise embodied within the scope of the appended claims.

What is claimed is:

1. A compound selected from the group consisting of steroids of the general formula

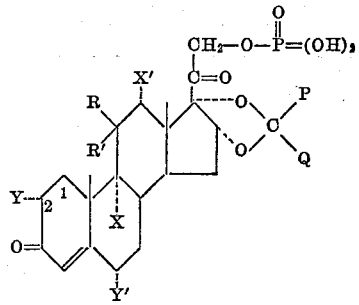

the 1,2-dehydro derivatives and the alkali metal salts thereof, wherein R is hydrogen, R' is β-hydroxy and together R and R' are keto; X is selected from the group consisting of hydrogen, halogen and lower alkyl; X' is selected from the group consisting of hydrogen and lower alkyl, at least one of the symbols X and X' being hydrogen; Y is selected from the group consisting of hydrogen and methyl; Y' is halogen; and P and Q are selected from the group consisting of hydrogen, lower alkyl, halo-lower alkyl, monocyclic cycloalkyl, monocyclic aryl, monocyclic aryl lower alkyl, monocyclic heterocyclic, and monocyclic heterocyclic lower alkyl, at least one of said P and Q representing other than hydrogen; and together with the carbon atom to which they are joined P and Q are selected from the group consisting of cycloalkyl and monocyclic heterocyclic.

2. 16α,17α-lower alkylidene-6α,9α-dihalo-16α-hydroxyhydrocortisone 21-phosphate.

3. 16α,17α-lower alkylidene-6α,9α-dihalo-16α-hydroxyprednisolone 21-phosphate.

4. 16α,17α-halo-lower alkylidene-6α,9α-dihalo-16α-hydroxyprednisolone 21-phosphate.

5. 16α,17α-lower alkylidene-6α-halotriamcinolone 21-phosphate.

6. 16α,17α-isopropylidene-6α-fluorotriamcinolone 21-phosphate.

7. 16α,17α-isopropylidene-6α-fluorotriamcinolone 21-phosphate potassium salt.

8. 16α,17α-lower alkylidene-6α-halo-16α-hydroxyprednisolone 21-phosphate.

9. 16α,17α-lower alkylidene-6α,9α-dihalo-12α-(lower alkyl)-16α-hydroxyhydrocortisone 21-phosphate.

10. A compound selected from the group consisting of steroids of the general formula

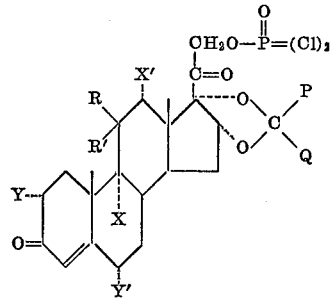

and the 1,2-dehydro derivatives thereof, wherein R is hydrogen, R' is β-hydroxy and together R and R' are keto; X is selected from the group consisting of hydrogen, halogen and lower alkyl; X' is selected from the group consisting of hydrogen and lower alkyl, at least one of the symbols X and X' being hydrogen; Y is selected from the group consisting of hydrogen and methyl; Y' is halogen; and P and Q are selected from the group consisting of hydrogen, lower alkyl, halo-lower alkyl, monocyclic cycloalkyl, monocyclic aryl, monocyclic aryl lower alkyl, monocyclic heterocyclic, and monocyclic heterocyclic lower alkyl, at least one of said P and Q representing other than hydrogen; and together with the carbon atom to which they are joined P and Q are selected from the group consisting of cycloalkyl and monocyclic heterocyclic.

11. 16α,17α-lower alkylidene-6α-halotriamcinolone 21-dichlorophosphate.

12. 16α,17α-isopropylidene-6α-fluorotriamcinolone 21-dichlorophosphate.

13. 16α,17α-isopropylidene-6α-fluoro - 16α - hydroxyprednisolone 21-phosphate.

References Cited in the file of this patent

UNITED STATES PATENTS

| | | |
|---|---|---|
| 2,183,589 | Reichstein et al. | Dec. 19, 1939 |
| 2,779,775 | Sarett | Jan. 29, 1957 |
| 2,932,657 | Christensen et al. | Apr. 12, 1960 |
| 2,966,486 | Smith et al. | Dec. 27, 1960 |
| 2,990,401 | Bernstein et al. | June 27, 1961 |